July 31, 1956
G. A. PHIPPS
2,756,821
SHEARING MACHINES
Filed Aug. 25, 1953
3 Sheets-Sheet 1
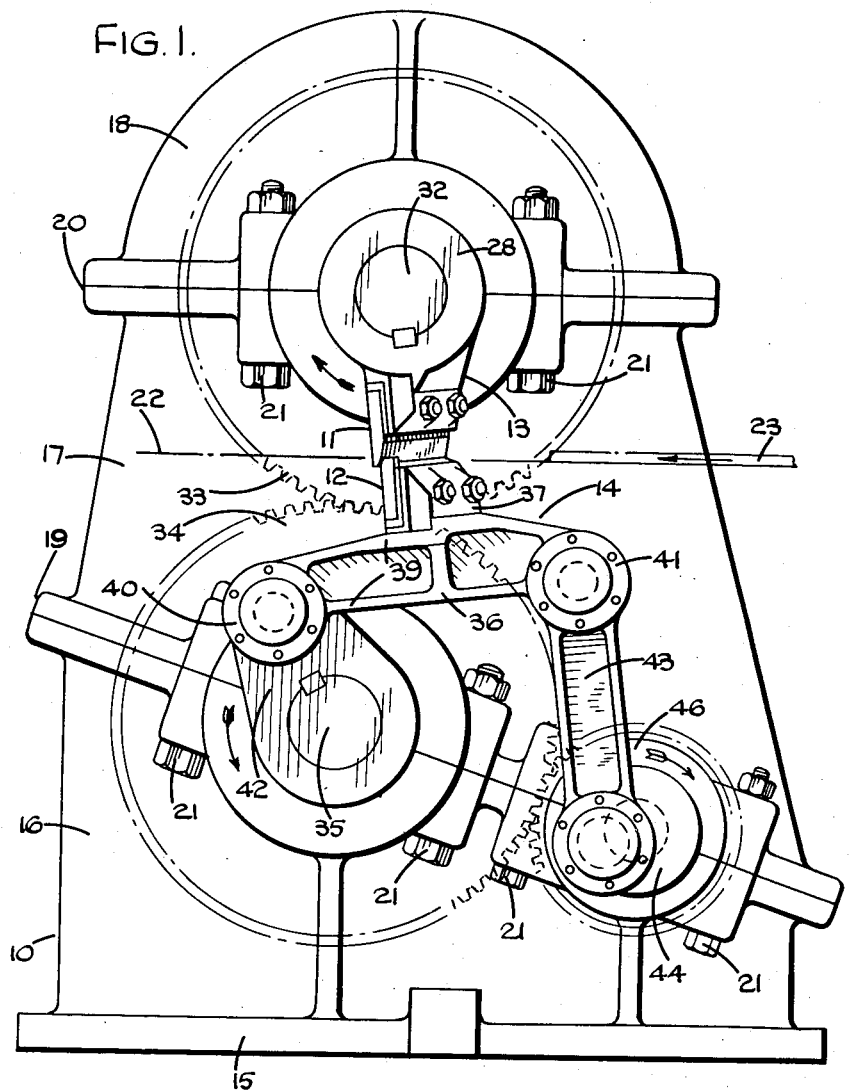
INVENTOR
George Alfred Phipps.
BY
Richardson, David and Nordon
his ATTORNEYS.

July 31, 1956      G. A. PHIPPS      2,756,821
SHEARING MACHINES
Filed Aug. 25, 1953      3 Sheets-Sheet 2
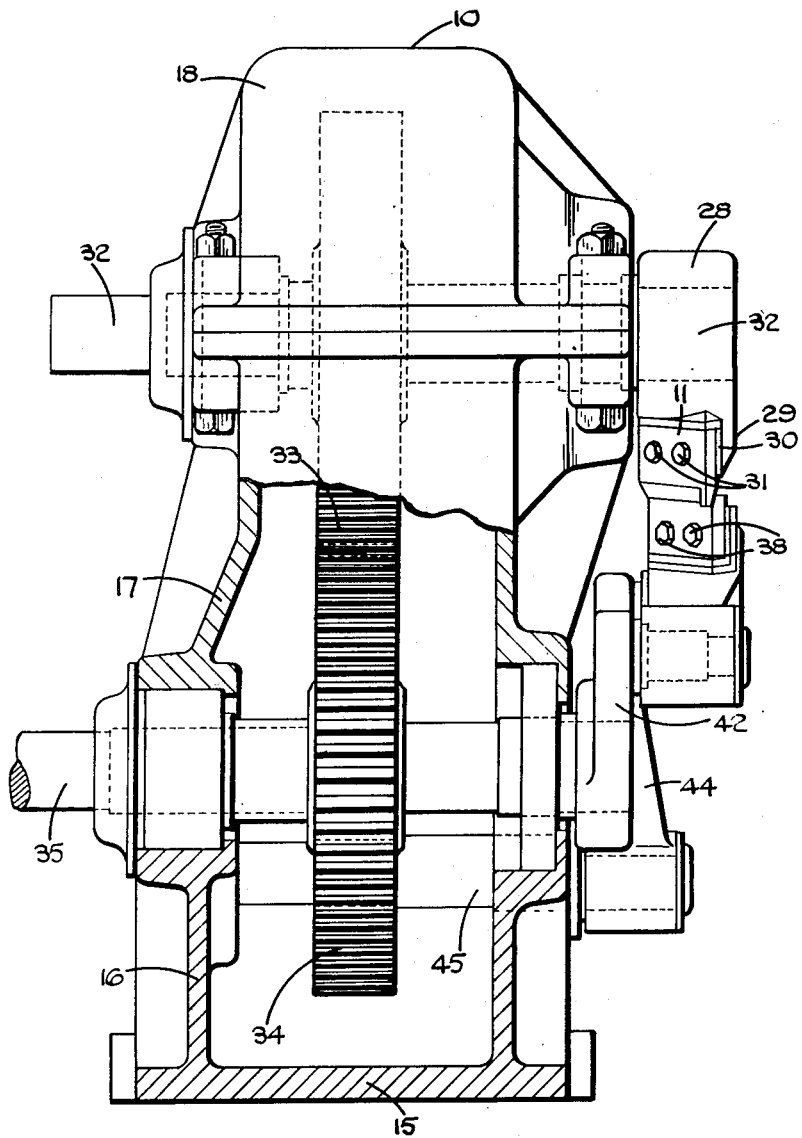

July 31, 1956
G. A. PHIPPS
2,756,821
SHEARING MACHINES
Filed Aug. 25, 1953
3 Sheets-Sheet 3
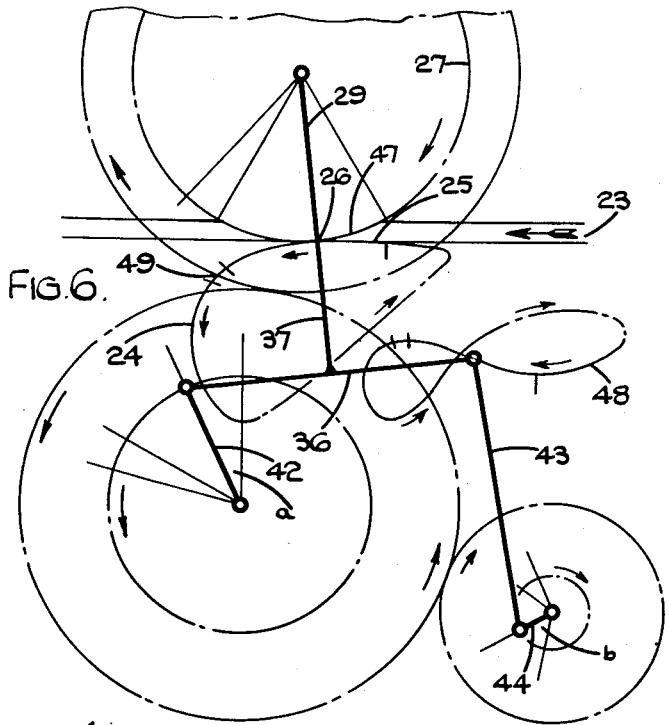
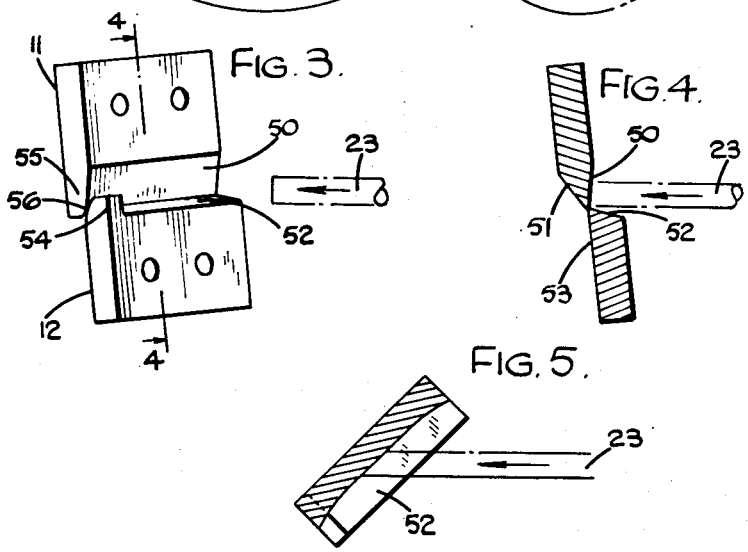
INVENTOR
George Alfred Phipps
BY Richardson, David and Nordon
his ATTORNEYS

United States Patent Office 2,756,821
Patented July 31, 1956

2,756,821
SHEARING MACHINES

George Alfred Phipps, Llandaff, Cardiff, Wales, assignor to Guest Keen & Nettlefolds (South Wales) Limited, Cardiff, Wales, a British company Application August 25, 1953, Serial No. 376,474

Claims priority, application Great Britain August 27, 1952

4 Claims. (Cl. 164—66)

The present invention relates to shearing machines of the kind for cutting or cropping stock of elongated form and is applicable primarily but not exclusively to shearing machines for the hot-cropping of stock produced in rod, bar and billet mills.

Existing types of machine used for this purpose tend to hook or distort the end of the stock adjacent to the plane in which shearing takes place and thus render the subsequent passage of such stock into a succeeding pass of the mill difficult. If the shearing has been performed after the final pass, the product will include a damaged or waste portion, where such hooking or distortion has occurred.

One of the principal objects of the present invention is to provide an improved construction of machine in which these disadvantages are obviated or reduced by imparting to the rearward shearing tool, that is to say the shearing tool which engages the stock on the side of the shearing plane from which the stock approaches the shearing zone a cyclic motion which so far as possible approximates to a rectilinear path in the region of the shearing zone, this tool thus affording support for the part of the stock adjacent to the severed piece and preventing hooking or the like longitudinal distortion as a result of the passage of the other or forward shearing tool through the thickness of the stock.

Another object of the present invention is to provide a simple, reliable and robust mechanism or assembly for supporting and moving this rearward shearing tool along the required path of motion, and which is capable of being operatively connected to operate in an unvarying phase relationship with the movemenet of the forward shearing tool to ensure that both these tools co-operate at a shearing zone to effect well defined and accurate shearing of the stock at the plane required. Yet another object of the present invention is to enable the stock to be sheared in a manner which facilitates subsequent entry into the later passes of a rod or bar mill by the arrangement of the shearing tools formed with cutting edges disposed obliquely across the stock feed path.

The invention will now be described with reference to the accompanying drawings illustrating by way of example a preferred embodiment of the invention and wherein:

Fig. 1 is a view in front elevation of one construction of shearing machine in accordance with the invention, the shearing tools being shown in the position which they occupy immediately after actual shearing of the stock.

Fig. 2 is a view in side elevation of the same construction, part of the body being broken away to show the drive mechanism for the shearing tools.

Fig. 3 is a fragmentary view in front elevation of the shearing tools themselves in the position which they occupy immediately after shearing.

Fig. 4 is a cross sectional view of the shearing tools on the line 4—4 of Figure 3.

Fig. 5 is a plan view of the shearing tools taken in horizontal cross section through the upper or forward tool, and Fig. 6 is a diagram illustrating the path of motion of the tool supporting members and associated drive mechanism.

In the construction of machine illustrated, the machine comprises the following main parts, a body or supporting structure 10, adjacent to one face of which hereinafter referred to as the front of the machine are mounted shearing tools 11 and 12, supporting means for these tools indicated generally and respectively at 13 and 14, and a driving mechanism for the supporting means comprising a system of gears accommodated within the body as clearly seen in Figures 1 and 2.

The body of the machine may be of any convenient or suitable form, and in the construction illustrated comprises a hollow housing having a base portion 15, which may be secured either directly to a concrete or like floor or to a bed-plate upon which may also be mounted a driving motor for the machine. To enable the various components of the drive mechanism and the tool supporting means to be readily assembled with the body, the latter may be formed in three separate sections, the lower one being indicated at 16, the intermediate section at 17, and the upper one at 18, these sections being secured together and mating along jointing planes 19 and 20 as shown, and secured together by bolts as indicated at 21.

The path along which stock is fed to and proceeds through the machine is indicated by the chain line 22 and although not shown in the drawings, it will be appreciated that the body may be provided with suitable formations or members for guiding the stock along this path in conjunction with the support afforded for the stock by the shearing tool 12 as hereinafter described in more detail.

The shearing tools 11 and 12 may be of the form illustrated in detail in Figures 3, 4, and 5, the upper tool 11 being so disposed in relation to the lower tool 12 as to engage the stock in advance of the lower tool. It will thus be understood that the lower or rearward tool 12 as it is hereinafter termed will form a support for the leading end of stock such as that indicated at 23 on the rearward side of the shearing plane, whilst on the forward side of the shearing plane the upper or forward tool 11 will in fact be depressing the stock somewhat below the feed path indicated at 22.

In order to a avoid hooking or longitudinal distortion of the leading end of the stock 23 on the rearward side of the shearing plane the rearward tool 12 has imparted thereto a cyclic path of motion of looped form as shown at 24, Fig. 6, which includes an approach portion 25 leading up to the shearing zone 26, which is substantially rectilinear or of very shallow arcuate form as illustrated, whilst the forward tool 11, has a cyclic path of motion which may be of circular form as indicated at 27, but which in any case carries this tool through the thickness of the stock 23 whilst the latter is in fact supported on the rearward tool during the shearing operation.

To effect these paths of motion for the two shearing tools 11 and 12 the former is supported on a rotary hub 28, from which extends a radial projection 29 formed with an open sided seating of L-shaped cross-section as indicated at 30, in which the forward tool 11 is secured by bolts 31.

The hub 28, is keyed to a mounting shaft 32, on which is fixed a gear 33, meshing with a further gear 34, having the same number of teeth and which is fixed on a driving shaft 35 parallel to the mounting shaft 32 but spaced vertically beneath it. The shaft 35 may be driven in a suitable manner, as for example by coupling to a variable speed hydraulic or electric motor which may be mounted on a common bed-plate with the shearing machine itself, a mechanical clutch and brake being interposed between the motor and the driving shaft 35.

The rearward tool is supported on an elongated tool supporting member 36 forming part of the link system 14 and which has an upwardly projecting formation 37 opposed to the projection 29 when the tools are at the shearing zone, this formation 37 being likewise formed with an open-sided seating of L-shape in cross-section in which the tool 12 is secured by means of bolts 38.

The elongated rearward tool supporting member 36 will be required to withstand substantial stresses in the downward direction, and may be in the form of a beam which is flanged as indicated at 39 at its upper and lower edges and at its ends it is formed with ring bearings or housings therefor as shown at 40 and 41 respectively of substantial diameter in order to permit the required components of cyclic motion to be imparted to this tool supporting member notwithstanding the relatively heavy loading thereof.

At its forward end the tool supporting member is mounted on a rotary crank hereinafter termed the primary crank, this being indicated at 42. This crank is keyed to the driving shaft 35 and consequently executes one complete revolution for each revolution of the forward tool.

At its rearward end the tool supporting member is itself supported by a pivotal link 43, the lower end of which is connected to a secondary crank 44 fixed to a counter-shaft 45, having a gear 46 fast thereon meshing with the gear 34 and having half the number of teeth of the latter.

The functioning of this link system and drive mechanism will best be understood by referring to Fig. 6 in which the tool supporting members, cranks and pivotal support link are shown as simple bars. The position of the various parts shown in Fig. 6 is that which obtains immediately after a shearing operation has been performed, the tools then being in position at the shearing zone 26.

The rearward tool supported by the formation 37 will have proceeded along the approach portion 25 of its path and during that time the primary crank 42 will have moved through the angle designated by *a* whilst the secondary crank 44 will have moved through an angle *b* situated as shown.

The length of the pivotal support link 43 is substantially greater than that of the secondary crank 44 and consequently the movement imparted to the rearward end of the member 36 from the secondary crank will be mainly in an upward and downward direction, whereas endwise movement of the member 36 in the general direction of the stock feed path will be derived principally from the primary crank 42.

In the position of the parts as shown the member 36 is approximately parallel to the stock feed path and the primary crank 42 and pivotal support link 43 are approximately perpendicular thereto, whilst the position of the secondary crank is such that during the approach portion 25 it will be imparting to the rearward end of the member 36 a raising movement which is in opposition to the slight falling movement which the forward end of the member 36 undergoes as the primary crank is moving through the angle *a*.

Consequently at an intermediate point on the member 36 to which the formation 37 is attached these raising and lowering movements will be substantially cancelled out, and the resultant movement imparted to the formation 37 will be the horizontal component of movement derived mainly from the primary crank 42.

Further, during this approach portion the velocity of the rearward tool along its path 24 will be substantially uniform assuming that the drive shaft 35 is rotated at uniform velocity. The velocity of the forward tool will thus also be uniform when moving along the corresponding approach portion 47 of its path.

The cyclic movement traced out by the rearward end of the member 36 as indicated at 48 is in the form of a figure 8, due to the two to one ratio afforded by the gearing connecting the primary and secondary cranks and the result is the elongated loop path 24 which beyond the shearing zone extends downwardly towards the position of rest of the machine as indicated at 49 and subsequently returns to the commencement of the approach portion 25, whilst concurrently accelerating the rearward tool.

It will be observed in Figures 3, 4, and 5 that the shearing tools 11 and 12 are each formed with cutting edges defined in the case of the forward cutting tool by the intersection of faces 50 and 51 and in the case of the rearward cutting tool by the intersection of faces 52 and 53. These cutting edges are preferably arranged obliquely in relation to the stock feed path as best seen in Figure 5, for example the cutting edges may be at 45° to this path.

Further, in order to ensure that the cutting edges of the two tools move towards and pass each other in closely adjacent relationship, but without fouling, co-operative formations are provided for guiding the tools relatively to each other, these formations comprising in the case of the tool 12 a projection 54, and in the case of the tool 11, the forward portion 55 which presents a face towards the projection 54 as best seen in Figure 3. The projection 54 has an inclined or oblique face 56, adapted to bear against the forward portion of the face 50 of tool 11, to effect the required guiding of the cutting edges past each other.

It is to be understood that in the foregoing description and in the claims, the term crank as applied to the primary and secondary cranks 42 and 44 is used in a generic sense to denote cranks, cams or eccentrics or any other suitable equivalent device for providing the required components of motion for the link system and likewise reference in the claims to the gearing of the primary and secondary cranks with each other and of the primary crank with the forward tool supporting means are to be deemed to include not only gear wheels as described and illustrated but any other suitable form of transmission means establishing a positively maintained phase-relationship between the cranks and the forward tool supporting means.

Further, whilst the operation of the tools by motion in vertical planes will ordinarily constitute the most convenient mode of operation of machine constructed in accordance with the invention, it will be understood that circumstances may arise in which motion of the tools in a horizontal plane or some other desired plane may be more convenient and that suitable modifications to this end may be carried out without departing from the scope of the invention.

The dimensions of the various components of the link system upon which the rearward tool is supported will be chosen in accordance with the particular requirements as to the degree of rectilinearality required for the approach portion 25 of the path of the rearward tool and in accordance with the velocity at which it is required to move, but as a general guide the following dimensions have been found to produce satisfactory results in the construction of the machine described and illustrated in detail:

| | |
|---|---|
| Length of primary crank arm 42 | 7½" |
| Length of secondary crank arm 44 | 2" |
| Length of pivotal support link 43 | 16²¹⁄₃₂" |
| Length of tool supporting member 36 | 18½" |
| Separation between shafts 35 and 45 | 19½" |
| Horizontal projection of this separation | 18½" |

The machine is especially applicable to the cutting of rod or bar stock into suitable lengths preparatory to feeding this stock to a cooling bed after it has been delivered from a rolling mill. However, the machine can be employed for a variety of purposes such as shearing scrap metal into suitable lengths for bundling. Further, the machine may be used for cropping the front end of billets after these have been passed through a roughing mill and before they are delivered to a finishing mill.

What I claim then is:

1. A shearing machine comprising a supporting structure, cooperative and relatively movable power driven shearing tools arranged on opposite sides of a stock feed path leading to a shearing zone, said tools being offset lengthwise of said stock feed path to lie adjacent to but one behind the other in the direction of stock feed to enable the tools in cooperation to shear stock fed along said path, and, means for supporting and moving the rearward of said tools comprising a link assembly including an elongated tool supporting member arranged lengthwise of the stock feed path, a primary crank supporting said member at a forward location, a secondary crank geared to the primary crank through a 2:1 ratio and supporting said member at a rearward location through the intermediary of a pivotal support link, the primary crank and the pivotal support link being approximately perpendicular to the tool supporting member in the position which these components occupy when the rearward tool is at the shearing zone, and the secondary crank being then positioned to move the tool supporting member transversely to the stock feed path and in opposition to any movement imparted to such member from the primary crank in a direction substantially parallel to the stock feed path, so that the rearward tool is thereby adapted to move along a path including an approach portion of substantially rectilinear form situated adjacent to said stock feed path, whereby said rearward tool can afford support for the stock as it approaches the shearing zone and while engaged by the forward of said shearing tools, and, a rotary support member for the forward shearing tool geared with the primary crank through a 1:1 ratio and adapted to move said forward tool transversely through the stock feed path along a portion thereof approaching the shearing zone, to cooperate with the rearward tool in shearing the stock.

2. A shearing machine comprising a supporting structure, cooperative and relatively movable power driven shearing tools arranged on opposite sides of a stock feed path leading to a shearing zone, said tools being offset lengthwise of said stock feed path to lie adjacent to but one behind the other in the direction of stock feed to enable the tools in cooperation to shear stock fed along said path, and, means for supporting and moving the rearward of said tools comprising a tool supporting member extending lengthwise of the stock feed path and mounted at longitudinally spaced positions on opposite sides of the rearward shearing tool on a primary crank and a pivotal support link, a secondary crank connected to said support link at a position spaced along it from the tool supporting member, the primary crank, support link and tool supporting member having, during movement of the rearward tool along an approach portion of its path to the shearing zone, a geometrical relationship such that the tool supporting member extends lengthwise of said path and the primary crank and support link are approximately perpendicular thereto, whereby movement of the rearward shearing tool lengthwise of the stock feed path is derived predominantly from the primary crank, the secondary crank at this time having a geometrical relationship with the support link such as to move same predominantly endwise in a direction opposed to any movement imparted to the tool supporting member from the primary crank perpendicular to the stock feed path.

3. A shearing machine comprising a supporting structure, cooperative and relatively movable power driven shearing tools arranged on opposite sides of a stock feed path leading to a shearing zone, said tools being offset lengthwise of said stock feed path to lie adjacent to but one behind the other in the direction of stock feed to enable the tools in cooperation to shear stock fed along said path, and, means for supporting and moving the rearward of said tools comprising a tool supporting member extending lengthwise of the stock feed path and mounted at longitudinally spaced positions on opposite sides of the rearward shearing tool on a primary crank and a pivotal support link, a secondary crank geared to the primary crank through step up gearing of 2–1 ratio and connected to said support link at a position spaced along it from the tool supporting member by a distance substantially greater than the throw of the secondary crank itself, the primary crank, support link and tool supporting member having, during movement of the rearward tool along an approach portion of its path to the shearing zone, a geometrical relationship such that the tool supporting member extends lengthwise of said path and the primary crank and support link are approximately perpendicular thereto, whereby movement of the rearward shearing tool lengthwise of the stock feed path is derived predominantly from the primary crank, the secondary crank at this time having a geometrical relationship with the support link such as to move same predominantly endwise in a direction opposed to any movement imparted to the tool supporting member from the primary crank perpendicular to the stock feed path.

4. A shearing machine comprising, a body spaced parallel shafts journalled horizontally therein and projecting from one side of the body, primary and secondary cranks fixed on said projecting portions of the shafts adjacent to said side of the body, an upwardly extending pivotal support link carried by the secondary crank, a beam connecting the primary crank and the pivotal support link at a position spaced along it from the secondary crank, a rearward shearing tool mounted on the beam intermediate its positions of connection to the primary crank and the pivotal support link, a forward shearing tool disposed above and forwardly of the rearward shearing tool, supporting means for the forward shearing tool movably mounted in the body in a manner such that the forward shearing tool can travel along an endless path having an approach portion extending both lengthwise of and through a stock feed path extending approximately horizontally above the rearward shearing tool and leading to a shearing zone, driving means connected with said supporting means and at least one of said shafts, means coupling the cranks to establish a phase relationship between the cranks such that while the primary crank is moving along an upper portion of its arcuate path extending lengthwise of the stock feed path, the secondary crank is reciprocating the pivotal support link endwise in a direction opposed to any rising or falling movement imparted to the beam by the primary crank, whereby the rearward shearing tool is moved along an approximately rectilinear approach path leading to the shearing zone and supports the stock behind the plane in which shearing thereof is effected by cooperation of the forward and rearward shearing tools.

References Cited in the file of this patent

UNITED STATES PATENTS

| Number | Name | Date |
|---|---|---|
| 162,607 | Biedinger | Apr. 27, 1875 |
| 1,359,076 | Langston | Nov. 16, 1920 |
| 1,398,474 | Strawn | Nov. 29, 1921 |
| 1,501,653 | Fine | July 15, 1924 |
| 1,505,711 | Johnson | Aug. 19, 1924 |
| 1,996,617 | Hahn | Apr. 2, 1935 |
| 2,026,533 | Haupt | Jan. 7, 1936 |
| 2,289,394 | Ungar | July 14, 1942 |

FOREIGN PATENTS

| 510,848 | Great Britain | Aug. 9, 1939 |